July 14, 1959
C. G. SONTHEIMER
2,895,105
PEAK READING VOLTMETER
Filed Feb. 25, 1952
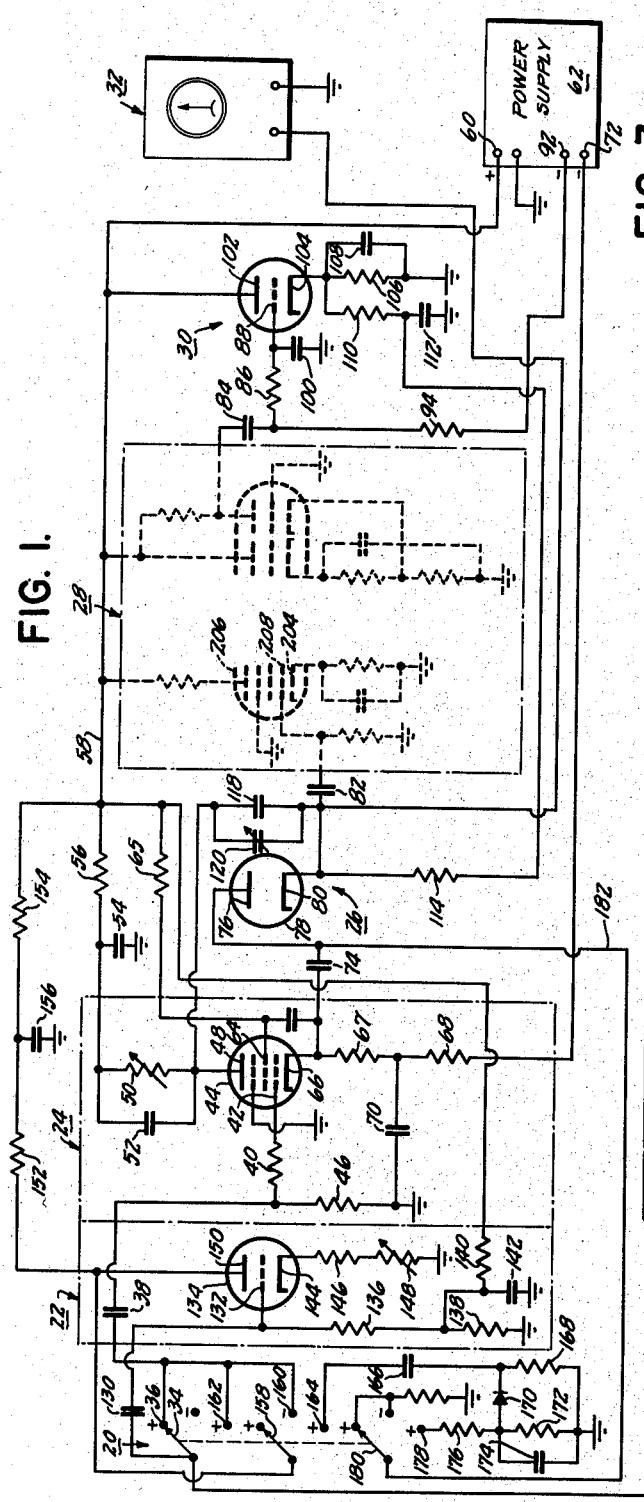
FIG. 1.
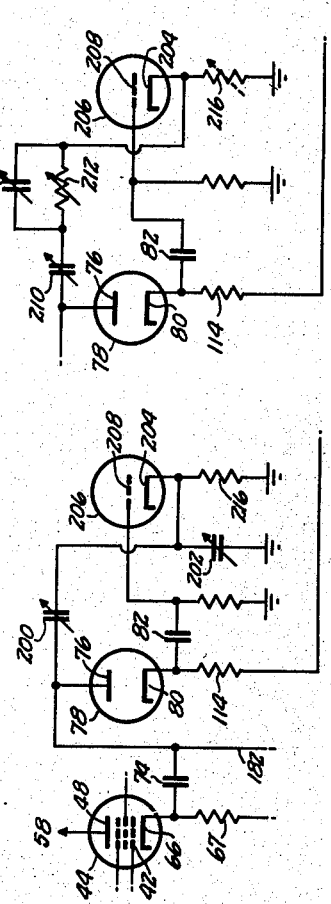
FIG. 3.
FIG. 2.
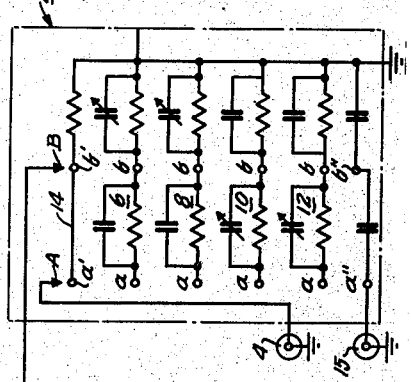
INVENTOR
CARL G. SONTHEIMER
BY
Curtis, Morris & Safford
ATTORNEYS

United States Patent Office 2,895,105
Patented July 14, 1959

2,895,105

PEAK READING VOLTMETER

Carl G. Sontheimer, Riverside, Conn., assignor to C.G.S. Laboratories, Inc., Stamford, Conn., a corporation of Connecticut Application February 25, 1952, Serial No. 273,203

11 Claims. (Cl. 324—103)

This invention is in the field of electronics and relates particularly to improvements in peak reading pulse voltmeters.

In voltmeters designed for reading the peak values of spaced electrical impulses, it is important not only that the instrument be accurate, but also that it be capable of measuring the peak values of very narrow pulses, that is, pulses having a very short time duration, and that it also be capable of responding accurately to pulses spaced by substantial intervals of time, that is, pulses having a low repetition rate. The present invention is directed to an improved voltmeter of this type having high accuracy and a wide operating range with respect to the duration of the individual pulses and the time interval between the successive pulses, and to such a voltmeter which is arranged to measure peak-to-peak voltage of pulses having successive or simultaneous signals of opposite electrical polarity.

The invention resides in improved neutralizing circuits and in the provision for peak-to-peak pulse voltage measurements, but other important features inherent in the structure will be in part apparent from the description and in part inherent in the illustrated circuits. For example, an improved neutralizing circuit is shown that not only provides desirable neutralization characteristics, but which also renders the apparatus less sensitive to differences in tube characteristics caused by changing tubes or by the ageing of the tubes in the voltmeter.

Figure 1 shows schematically the circuit diagram of a peak reading pulse voltmeter embodying the invention;

Figure 2 shows a modified neutralizing circuit that may be incorporated in the apparatus of Figure 1; and Figure 3 shows still another neutralizing circuit which may be incorporated into the apparatus of Figure 1.

In order to provide several operating ranges for the peak voltmeter, a step type calibrated attenuator, generally indicated at 2, is connected to an input terminal 4 and to the common ground circuit. The attenuator includes a number of separate resistor-capacitor voltage divider attenuating circuits, indicated respectively at 6, 8, 10, and 12. Each of the attenuator circuits is provided with two terminals indicated, respectively, at $a$ and $b$, which form stationary contacts on a rotary switch, arranged to be connected, respectively, with movable switch contacts A and B. In addition, two switch contacts $a'$ and $b'$ are connected by a jumper 14 so that when contacts A and B are connected to them, no attenuation is introduced. Two other switch contacts $a''$ and $b''$ are connected to a capacitive attenuator arranged to provide maximum attenuation and minimum voltage sensitivity of the instrument, a separate input terminal 15 being provided for this high voltage circuit.

Thus, with a signal voltage applied between the input terminal 4 and ground, the voltage appearing between a lead 16, connected to the switch contact B, and the common ground circuit depends upon the setting of the attenuator switch. In this example, when the switch contacts A and B are connected to the stationary contacts $a'$ and $b'$, so that no attenuation is introduced, the instrument has a full-scale sensitivity of ten volts.

When the attenuator circuits 6, 8, 10, and 12 are connected, the full-scale readings of the instrument correspond, respectively, to input voltages of 50, 100, 500, and 1000. The separate input terminal 15 connected to the capacitor attenuator circuit, having switch contacts $a''$ and $b''$, provides a full-scale reading of 5000 volts.

A three-position switch, generally indicated at 20, is arranged so that the instrument responds only to positive input pulses when the switch is in the position shown. When in the next position, the instrument responds to negative pulses, and when the switch 20 is in its third position, the instrument measures the peak-to-peak voltage of the incoming pulses.

A phase inverter stage, generally indicated at 22, is utilized to reverse the phase of the incoming pulse when negative pulses are to be measured. A cathode-follower stage, generally indicated at 24, provides isolation between the input and measuring circuits and prevents the measuring circuits from loading the input circuits.

The output from a diode-rectifier voltage-comparison stage, generally indicated at 26, is amplified by a conventional amplifier, indicated in block form at 28, including a cathode-coupled stage that drives an infinite-impedance detector, generally indicated at 30.

The output voltage from the detector stage 30 is fed back to the diode stage 26 where it is applied in opposition to the incoming pulses so that only the voltage difference between the feed-back voltage and the peak voltage of the pulses applied to the diode stage 26 is fed into the amplifier 28. Accordingly, a D.-C. voltage developed at the diode stage may be used as a measure of the pulse amplitude. This voltage is measured by a conventional vacuum tube voltmeter, indicated in block form at 32.

Further information relative to the operation of instruments of this general type can be found in the February 1947 issue of the Proceedings of the Institute of Radio Engineers at pages 208 and 211.

With the switch 20 in the position shown, the signal pulses on the lead 16 from the attenuator 2 are coupled through an arm 34 and contact 36 of the switch 20, a coupling condenser 38, and a suppression resistor 40 to a control grid 42 of the cathode-follower tube 44, a D.-C. ground return being provided by a resistor 46. With the switch 20 in this position, the phase inverter stage 22 is not utilized.

The anode 48 of the cathode-follower tube 44 is connected through an adjustable resistor 50, in parallel with a condenser 52, and a decoupling circuit comprising a shunt condenser 54 and series resistor 56 to a positive voltage supply lead 58 from an output terminal 60 of a conventional well-regulated power supply, indicated in block form at 62. The screen grid 64 of the tube 44 is connected to the positive supply lead 58 in conventional manner through a series voltage-dropping resistor 65.

The cathode 66 of the tube 44 is connected through a load resistor 67 and a decoupling circuit, including a series resistor 68 and a shunt condenser 70, to a negative voltage terminal 72 on the power supply 62.

The signal developed across the cathode load resistor 67 is coupled through a condenser 74 to an anode 76 of a low capacity diode 78.

The alternating component of the signal developed at the cathode 80 of the diode 78 is coupled through a condenser 82 to the first stage of the amplifier 28. This amplifier is a conventional resistance-capacitance coupled amplifier having four stages, and a relatively wide pass-band, the last stage of the amplifier being cathode-coupled to the preceding stage.

The output signal from the amplifier 28 is coupled through a condenser 84 and a resistor 86 to a control grid 88 of an infinite impedance detector tube 90. This tube is biased substantially to cut-off by a negative voltage applied to the grid 88. This voltage is derived from the power supply 62, a negative output terminal 92 of which is coupled through an isolating resistor 94 and the series resistor 86 to the control grid 88. A small suppression condenser 100, for example having a capacity of 30 micromicrofarads, is connected between the control grid 88 and the common ground circuit.

The anode 102 of this tube is connected directly to the positive supply lead 58 and its cathode 104 is connected to ground through a cathode load resistor 106, for example having a resistance of approximately two megohms, to which is connected in shunt a capacitor 108 having a value, for example, of 0.05 microfarad.

The D.-C. voltage developed at the cathode 104 is connected through a filter circuit comprising a series resistor 110, a shunt capacitor 112, and a second series resistor 114 to the cathode 80 of the diode 78.

As explained above, the voltage which is fed back from the cathode 104 of the infinite detector stage 30 to the cathode 80 of the diode tube 78 opposes the incoming pulse signals, so that the diode 78 carries current only when the voltage of the pulses applied to the anode 76 of the diode 78 exceeds the value of the fed-back bias voltage applied to the cathode 80. The peaks of the pulses feed through the amplifier and tend to increase the amount of voltage fed back so that the D.-C. voltage appearing at the cathode 80 is substantially equal to the peak voltage of the incoming pulses. This D.-C. voltage is measured by the vacuum tube voltmeter 32 connected between the cathode 80 and the common ground circuit.

Because of the inter-electrode capacity between the anode 76 and the cathode 80, the pulse signals are coupled through the diode to the cathode 80 and these signals are not opposed by the D.-C. voltage and so are fed directly through the amplifier 28 and result in indications on the voltmeter that are too high.

In order to neutralize the pulse voltage that is capacitively fed through the diode tube, a voltage of opposite polarity and equal in magnitude to the pulse signals is applied to the cathode 80 to "block out" this undesired voltage. To this end, a variable resistor 50 is inserted as a plate load resistor in the anode circuit of the cathode-follower tube 44. The voltage developed across the resistor 50 is coupled through a fixed condenser 118, in parallel with a variable condenser 120, to the cathode 80. It will be apparent that the voltage developed at the anode 48 of the tube 44 is of opposite polarity from the voltage developed at the cathode 66 of this tube, and that the voltage applied to the cathode 80 through the inter-electrode capacitance of the tube 78, will be opposite in phase from the voltage applied to this cathode from the anode 48 of the tube 44, except for phase shifts introduced by the circuit elements and wires.

In order for the instrument to have maximum utility, the neutralizing voltage fed to the cathode 80 must be controlled precisely, and by properly controlling this voltage, a very marked improvement in the response of the instrument is obtained. For example, in earlier arrangements a plate load resistor corresponding to the resistor 50 of the tube 44 was used which had a resistance of several thousand ohms and represented a magnitude of the order of $\frac{1}{10}$ of the magnitude of the resistor 67 in the cathode circuit. This voltage was then coupled to the cathode 80 through a very small condenser, for example having a capacitance less than 25 micromicrofarads. Such an arrangement does not provide sufficiently accurate neutralizing voltage, even if the value of the coupling condenser, corresponding to condensers 118 and 120, are adjusted for optimum operation.

With such earlier neutralizing arrangements, it was necessary to have a substantial capacity connected between the cathode 80 and the common ground circuit in order to provide an integration of the opposed signals. Thus, for example, it was not unusual to find a 4,000 micromicrofarad capacitor connected between the cathode 80 and the common ground circuit. Obviously, such a large capacity limits the operation of the instrument so that it will not respond accurately to very narrow pulses, particularly if the duty cycle is low.

With the present arrangement, the plate resistor 50 has a very low value compared with the resistance of the cathode resistor 67, for example, in the circuit shown, the resistor 50 had a maximum value of 100 ohms in a commercial instrument, whereas the cathode resistor 67 is of the order of 7,000 ohms or higher. The total capacity of the condensers 118 and 120 is of the order of 200 to 500 micromicrofarads. This arrangement in itself provides a superior neutralizing voltage. Moreover, in the present instance, two separate controls are provided for adjusting the phase and magnitude of the neutralizing voltage, thus the variable condenser 120 is provided and the resistor 50 is made variable, these two adjustments being set for optimum operation. In addition, a condenser 52, in this particular example having a capacitance of 9,000 micromicrofarads, is connected in parallel with the plate resistor 50 and gives further improved neutralization.

When the switch 20 is moved to its next or central position, the voltmeter is responsive to and measures the magnitude of negative pulses. The signals now are passed through the phase-inverter stage 22 in order to change the polarity of the incoming pulses. With the switch in this position, the incoming pulses on lead 16 are fed, without going through the switch 20, through a coupling condenser 130 to a control grid 132 of a phase inverter tube 134, a ground return circuit being provided through resistors 136 and 138. A positive bias is applied to the control grid 132 by means of a voltage divider consisting of a resistor 140 and the grid return resistor 138 connected in series between the positive supply lead 58 and the common ground circuit. A decoupling capacitor 142 is connected between the junction of resistors 136, 138, and 140 and the ground.

The cathode 144 of the tube 134 is connected through a fixed resistor 146 and a variable resistor 148 to ground. The anode 150 of this tube is connected through a plate load resistor 152 and a decoupling network, comprising a series resistor 154 and a shunt condenser 156, to the positive voltage supply lead 58. The voltage developed at the anode 150 is connected through a switch arm 158 and a contact point 160 of the switch 20 to the coupling condenser 38 by which it is fed to the cathode follower stage 24 to actuate the pulse voltmeter in the same manner as incoming positive voltages as described above.

In order to provide peak-to-peak measurement of incoming positive and negative pulses, the switch 120 is moved to its third position in which the arm 34 of the switch 20 is connected to a contact point 162 by which the incoming pulses are fed through the coupling condenser 38 into the cathode follower stage 24, the positive portions of the pulses actuating the voltmeter in the same manner as when the switch 20 is in its first position.

The incoming pulse signals are applied also to the phase inverter stage in the manner just described, and the positive pulse signals developed at the anode 150 of the phase inverter tube 134 are connected through the switch arm 158 and a contact point 164 of the switch 20, a coupling condenser 166, and a resistor 168 to the common ground circuit. The pulse voltage developed across the resistor 168 is rectified by means of a half-wave rectifier 170 to develop a D.-C. voltage across a load resistor 172 and a condenser 174, in shunt with the resistor 172, connected between one terminal of the rectifier 170 and the ground circuit. The D.-C. voltage developed across the resistor 172 is fed through a series resistor 176, a contact point 178 and arm 180 of the switch 20, and a lead 182 to the anode 76 of the diode 78.

With this arrangement, the incoming positive pulses are fed through the cathode-follower stage 24 and applied to the anode 76 of the diode 78 as positive pulses. The negative pulses are inverted in phase by means of the phase inverter stage 22 changing them into positive pulses which are in turn rectified by the rectifier 170 to produce a D.-C. voltage that is applied to the anode 76 of the diode 78 along with the incoming positive pulses. This positive voltage, which is derived from the incoming negative pulses, on the anode of tube 76, increases the positive potential which the cathode 80 of this tube can have and still permit conduction of the pulse signals. Accordingly, the cathode 80 will develop sufficient bias to equal the total peak voltage on the anode 76, this voltage being equal to the absolute sum of the positive and negative peak voltages of the incoming pulse. Accordingly, the vacuum tube voltmeter 32 will indicate the peak-to-peak voltages of the incoming pulses.

Figure 2 shows a modified neutralization circuit having some advantages over the circuit arrangement shown in Figure 1. This circuit will ordinarily permit more precise neutralization and the effectiveness of the neutralization is substantially independent of the amplitude of the incoming pulses. Moreover, the neutralizing circuit is independent of the characteristics of the tube 44 and so is unaffected when this tube ages or is replaced.

Figure 2 shows only a portion of the complete circuit, the components duplicating the circuit of Figure 1 being designated by corresponding numbers.

A capacitive voltage divider formed of two adjustable capacitors 200 and 202 is connected between the anode 76 of the diode tube 78 and the common ground circuit. The junction of these two condensers is connected to the cathode 204 of a tube 206 which forms the first stage of the amplifier 28. Thus, the neutralizing voltage is combined with the signal voltage, in opposition, in the tube 206. The voltage difference between the magnitude of the feed-back voltage applied to the cathode 80 and the peak magnitudes of the incoming pulses is applied as positive pulses to the control grid 208 of the tube 206. These pulse signals tend to increase the current through the tube 206 and this change is opposed by the neutralizing voltage applied to the cathode 204, which tends to decrease the current through this tube. The condensers 200 and 202 are adjusted so that the voltage at the junction of the condensers is just equal to the voltage produced at the cathode 80 of the tube 78 by virtue of the cathode-plate capacitance. This condition obtains when the time constant of the neutralizing circuit is equal to the time constant of the circuit through the diode.

Figure 3 shows still another neutralizing arrangement. The components corresponding to those of Figure 2 are designated by the same numbers, only the portion of the circuit necessary to illustrate the modification being shown. In this embodiment, the neutralizing circuit comprises an adjustable capacitor 210 and a variable resistor 212 connected in series between the anode 76 of the diode 78 and the cathode 204 of the amplifier tube 206. A small capacitor 214 is connected in shunt with the resistor 212.

The resistor 212 and the capacitor 210 are adjusted to produce optimum neutralization. Alternatively, the resistor 212 may be made fixed in value and the cathode resistor 216 of the tube 206 made adjustable.

The following tables give values of certain of the circuit components actually used in operating systems.

| Reference Character | Name | Value |
| --- | --- | --- |
| | Figure 1 | |
| 50 | Resistor | 100 (maximum). |
| 52 | Capacitor | 0.009 microfarad. |
| 74 | ----do---- | 1.0 microfarad. |
| 118 | ----do---- | 450 micromicrofarads. |
| 120 | ----do---- | 50 micromicrofarads (maximum). |
| 82 | ----do---- | 0.01 microfarad. |
| | Figure 2 | |
| 74 | Capacitor | 0.25 microfarad. |
| 82 | ----do---- | Do. |
| 200 | ----do---- | 12-62 micromicrofarads. |
| 202 | ----do---- | 150-200 micromicrofarads. |
| 216 | Resistor | 180 ohms. |
| | Figure 3 | |
| 82 | Capacitor | 0.25 microfarad. |
| 210 | ----do---- | 12-62 micromicrofarads. |
| 214 | ----do---- | 4-25 micromicrofarads. |
| 212 | Resistor | 1,000 ohms. |
| 216 | ----do---- | 200 ohms. |

What is claimed is:

1. In a peak pulse voltmeter of the type wherein the pulse signals are rectified and fed into an amplifier system that produces a D.-C. voltage that is fed back as a bias voltage to the rectifier in opposition to the incoming pulses, apparatus comprising a common ground circuit, a diode tube having an anode connectible to a source of pulse signals and a cathode, a wide-band amplifier having input and output stages, said input stage including a vacuum tube having a control grid and a cathode, said output stage being controlled by said input stage and including a detector and a filter circuit connected thereto, a high impedance load circuit connected between said diode cathode and the common ground circuit, a first capacitor connected between said diode cathode and said control grid of said vacuum tube in said input stage, a second variable condenser having a capacity range of approximately 12 to 62 micromicrofarads connected between said rectifier anode and said cathode of said vacuum tube in said input stage, a third variable capacitor connected between said cathode of said vacuum tube in said input stage and the common ground circuit and having a capacity range of approximately 150 to 200 micromicrofarads, a cathode resistor in circuit between said cathode of said vacuum tube in said input stage and said common ground circuit, and circuit means coupling said filter circuit to the cathode of said diode.

2. In a peak pulse voltmeter of the type wherein the pulse signals are rectified and fed into an amplifier system that produces a D.-C. voltage which is fed back as a bias voltage to the rectifier in opposition to the incoming pulses, a neutralizing circuit comprising a common ground circuit, a diode tube having an input electrode connectible to a source of pulse signals and an output electrode, a wide-band amplifier having input and output stages, said input stage including a vacuum tube having a control grid and a cathode, said output stage being coupled to said input stage and including a detector and a filter circuit connected thereto, a high impedance load circuit connected between said output electrode of the diode and the common ground circuit, a first capacitor connected between said output electrode of the diode and said control grid of said tube in said input stage, a second variable condenser being connected between said input electrode and said cathode of said tube in said input stage, a third variable capacitor connected between said cathode of said tube in said input stage and the common ground circuit, a conductive return circuit between said cathode of said tube and said common ground circuit, and feedback circuit means coupling the output from said filter circuit to the cathode of said diode.

3. In a peak pulse voltmeter of the type wherein the pulse signals are rectified and fed into an amplifier system that produces a D.-C. voltage that is fed back as a bias voltage to the rectifier in opposition to the incoming pulses, apparatus comprising a common connecting circuit, a rectifier having an input terminal connectible to a source of pulse signals and an output terminal, an amplifier having input and output stages, said input stage including a vacuum tube having first and second control electrodes, a load circuit connected between said output terminal of the rectifier and the common circuit, a first capacitor connected between said output terminal of the rectifier and said first control electrode of said tube in said input stage, a second variable condenser connected between said rectifier input terminal and said second control electrode of said tube in said input stage, a third variable capacitor connected between said second control electrode of said tube in said input stage and the common circuit, and circuit means connecting said output stage to the output terminal of said rectifier.

4. In a peak pulse voltmeter wherein the pulse voltages are amplified, detected, filtered, and fed back as a bias voltage to oppose the incoming pulse signals, a neutralizing circuit comprising a common circuit, a rectifier having input and output electrodes, means for impressing pulse signals to be measured between said rectifier input electrode and said common circuit, an amplifier having an input stage including a vacuum tube having at least two control electrodes, first resistance means connecting one of said amplifier electrodes to the common circuit, a first capacitor connecting said rectifier output electrode to one of said control electrodes, second and third variable condensers connected in series between said rectifier input electrode and the other of said amplifier electrodes, and second resistance means connected in parallel with said third condenser.

5. In a peak pulse voltmeter wherein the pulse voltages are amplified, detected, filtered, and fed back as a bias voltage to oppose the incoming pulse signals, a neutralizing circuit comprising a common ground circuit, a diode rectifier having input and output electrodes, means for impressing pulse signals to be measured between said input electrode and said common ground circuit, an amplifier having an input stage including a vacuum tube having a cathode and a control grid, first resistance means connecting said amplifier cathode to the common ground circuit, a first capacitor connecting said output electrode of the diode to said control grid, second and third variable condensers connected in series between said input electrode of the diode and said amplifier cathode, and second resistance means connected in parallel with said third condenser.

6. In a peak pulse voltmeter wherein the pulse voltages are amplified, detected, filtered, and fed back as a bias voltage to oppose the incoming pulse signals, a neutralizing circuit comprising a common ground circuit, a diode rectifier having an anode and a cathode, means for impressing pulse signals to be measured between said diode anode and said common ground circuit, an amplifier having an input stage including a vacuum tube having a cathode and a control grid, first resistance means connecting said amplifier cathode to the common ground circuit, a first capacitor connecting said diode cathode to said control grid, second and third variable condensers connected in series between said diode anode and said amplifier cathode, said second variable condenser having a capacity range of approximately 12 to 62 micromicrofarads, said third condenser having a capacity range of approximately 4 to 25 micromicrofarads, and second resistance means connected in parallel with said third condenser.

7. In a peak-reading voltmeter of the type including a diode-rectifier having an input terminal and an output circuit, said voltmeter being adapted to measure the peak voltage amplitude of signal pulses, the pulses to be measured being fed to the input terminal of said diode-rectifier with components of respective pulse being conducted through said diode-rectifier to its output circuit, a biasing circuit connected to said diode rectifier to bias the diode-rectifier to oppose the conduction of pulses therethrough: an improved neutralizing circuit for neutralizing the error introduced because of the coupling of components of respective pulses through said diode-rectifier as caused by capacitance therein, said improved neutralizing circuit including a broad-band amplifier following said diode-rectifier, said broad-band amplifier having a common return circuit and an input stage with first and second control electrodes for said input stage of opposite control action, said broad-band amplifier having an output stage coupled to the output of said input stage and including a detector and filter circuit connected thereto and connected to said biasing circuit, a first coupling circuit connected between the output circuit of said diode-rectifier and said first control electrode for feeding to said input stage a first signal having components corresponding to the components of the respective pulses conducted by said diode-rectifier, said first coupling circuit also feeding to said input stage the components of respective pulses which are capacitance-coupled through said diode-rectifier, said first coupling circuit including a first capacitor connected between the output circuit of said diode-rectifier and said first control electrode and resistance means connected between said first control electrode and the common return circuit, the impedance between the output circuit of said diode-rectifier and said common return circuit being provided by said first capacitor and said resistance means in series and being high, a second coupling circuit including a second capacitor which is adjustable and is coupled between the input terminal of said diode-rectifier and the second electrode of said input stage, said second coupling circuit including a third capacitor which is adjustable and is connected between said second control electrode and said common return circuit, said second coupling circuit feeding to said input stage a second signal having components of opposite control action corresponding to the components which are capacitance coupled through said diode-rectifier, the time-constants of said first and second coupling circuits being equal, and indicating means connected to said detector and filter circuit.

8. In a peak-reading voltmeter including a diode-rectifier having an input terminal and an output terminal, said voltmeter being adapted to measure the peak voltage amplitude of signal pulses, the pulses to be measured being fed to the input terminal of said diode-rectifier with components of respective pulses being conducted through said diode-rectifier to its output circuit, a biasing circuit connected to said diode rectifier to bias the diode-rectifier to oppose the conduction of pulses therethrough, and indicating means connected to said biasing circuit: an improved neutralizing circuit for neutralizing the error introduced because of the coupling of components of respective pulses through said diode-rectifier as caused by capacitance therein, said improved neutralizing circuit including a broad-band amplifier following said diode-rectifier, said broad-band amplifier having a common return circuit and an input stage with first and second control electrodes for said input stage of reverse phase control action, said broad-band amplifier having an output stage coupled to the output of said input stage and including a detector and filter circuit connected thereto and connected to said biasing circuit, a first resistance-capacitance coupling circuit connected between the output terminal of said diode-rectifier and said first control electrode for feeding to said input stage a first signal having components corresponding to the components of the respective pulses conducted by said diode-rectifier, said first coupling circuit also feeding to said input stage the components of respective pulses which are capacitance-coupled through said diode-rectifier, said first coupling circuit including a first capacitor connected between the output terminal of said diode-rectifier and said first control electrode and resistance means connected between said first control electrode and the common ground circuit, the total impedance between the output terminal of said diode-rectifier and said common return circuit being generally defined by said first capacitor and said resistance means in series, a second coupling circuit having resistance and capacitance associated therewith and coupled between the input terminal of said diode-rectifier and the second electrode of said input stage for feeding to said input stage a second signal having components of phasing reversed to the components which are capacitance coupled through said diode-rectifier, said second coupling circuit including a second capacitor and a second resistor in serial relation between the input terminal of said diode rectifier and said second control electrode with a third capacitor shunted across said second resistor, and a third resistor between said second control electrode and said common return circuit, the time-constants of said first and second coupling circuits being equal.

9. In a peak-reading voltmeter having a voltage comparison stage with a diode-rectifier therein, said diode-rectifier having a plate and an output circuit, said voltmeter being adapted to measure the peak voltage amplitude of signal pulses, the pulses to be measured being fed through an input circuit to the plate of said diode-rectifier in said voltage comparison stage, a part of each of said pulses being conducted through said diode-rectifier and a part of each of said pulses being coupled through said diode-rectifier by means of capacitance, a biasing circuit connected to said diode-rectifier to bias the diode-rectifier to oppose the conduction of said pulses and including indicating means connected to said biasing circuit to provide an indication of the magnitude of said bias and hence providing an indication of the peak voltage amplitude of said pulses: an improved neutralizing circuit for neutralizing the error introduced into said indication because of said capacitance coupling, said improved neutralizing circuit including a common return circuit, a voltage-amplifier stage following said voltage-comparison diode-rectifier stage, a vacuum tube in said voltage amplifier stage having a cathode and a grid, a first coupling circuit connected between the output circuit of said diode-rectifier and said grid for feeding to said grid a first signal portion corresponding to the part of each of said pulses conducted by said diode, said first coupling circuit also feeding to said grid a second signal portion corresponding to the part of each of said pulses capacitance-coupled through said diode, a second coupling circuit connected between said plate of said diode-rectifier and said cathode of said amplifier tube for feeding to said cathode a third signal portion corresponding to the part of each of said pulses capacitance-coupled through said diode-rectifier, said second coupling circuit comprising a capacitor connected between the plate of said diode and said cathode and a capacitor and a resistor in parallel between said cathode and said common return circuit, and said first coupling circuit comprising a capacitor connected from the diode output circuit to said grid and a resistor between said grid and said common return circuit, the time constants of said first coupling circuit and of said second coupling circuit being equal, whereby said second and third signal portions have similar wave forms and are cancelled out in said amplifier tube, and detector and filter means connected from the output of said voltage-amplifier stage to said biasing circuit.

10. In a peak-reading voltmeter having a voltage comparison stage with a diode-rectifier therein, said diode-rectifier having a plate and an output circuit, said voltmeter being adapted to measure the peak voltage amplitude of signal pulses, the pulses to be measured being fed through an input circuit to the plate of said diode-rectifier in said voltage comparison stage, a part of each of said pulses being conducted through said diode-rectifier and a part of each of said pulses being coupled through said diode-rectifier by means of capacitance, a biasing circuit connected to said diode-rectifier to bias the diode-rectifier to oppose the conduction of said pulses and including indicating means connected to said biasing circuit to provide an indication of the magnitude of said bias and hence providing an indication of the peak voltage amplitude of said pulses: an improved neutralizing circuit for neutralizing the error introduced into said indication because of said capacitance coupling, said improved neutralizing circuit including a common ground circuit, a voltage-amplifier stage following said voltage-comparison diode-rectifier stage, a vacuum tube in said voltage amplifier stage having a cathode and a grid, a first coupling circuit connected between the output circuit of said diode-rectifier and said grid for feeding to said grid a first signal portion corresponding to the part of each of said pulses conducted by said diode, said first coupling circuit also feeding to said grid a second signal portion corresponding to the part of each of said pulses capacitance-coupled through said diode, a second coupling circuit connected between the plate of said diode-rectifier and said cathode of said amplifier tube for feeding to said cathode a third signal portion corresponding to the part of each of said pulses capacitance-coupled through said diode-rectifier, said second coupling circuit comprising a first capacitor and a first and second resistor connected in series between the plate of said diode and said common ground circuit and a second capacitor connected in parallel with one of said resistors, said cathode of said amplifier tube being connected to said first and second resistors, and said first coupling circuit comprising a capacitor connected from said diode output circuit to said grid and a resistor between said grid and said common ground circuit, the time constants of said first coupling circuit and of said second coupling circuit being equal, whereby said second and third signal portions have similar wave forms and are cancelled out in said amplifier tube, and detector and filter means connected from the output of said voltage-amplifier stage to said biasing circuit.

11. A peak-reading voltmeter having the improved circuit of claim 10 wherein said second capacitor is connected across said first resistor and said grid is connected to the junction of said first and second resistors.

References Cited in the file of this patent

UNITED STATES PATENTS

| | | |
|---|---|---|
| 2,199,757 | Rohde | May 7, 1940 |
| 2,453,958 | Andresen | Nov. 16, 1948 |
| 2,501,769 | Frommer | Mar. 28, 1950 |
| 2,694,181 | Lax | Nov. 9, 1954 |
| 2,708,736 | Creveling et al. | May 17, 1955 |

OTHER REFERENCES

Article: An Automatic-Slideback Peak Voltmeter for Measuring Pulses, by Creveling and Mantner, pub. in Proc. I.R.E., vol. 35, February 1947, pages 208–211.